United States Patent
Takatsuna

(10) Patent No.: US 8,663,885 B2
(45) Date of Patent: Mar. 4, 2014

(54) POSITIVELY CHARGEABLE TONER

(75) Inventor: Toru Takatsuna, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 5 days.

(21) Appl. No.: 13/570,815

(22) Filed: Aug. 9, 2012

(65) Prior Publication Data

US 2013/0040235 A1    Feb. 14, 2013

(30) Foreign Application Priority Data

Aug. 11, 2011   (JP) .................... 2011-176254

(51) Int. Cl.
*G03G 9/08*    (2006.01)

(52) U.S. Cl.
USPC ............... 430/108.1; 430/105; 430/108.3; 430/108.7

(58) Field of Classification Search
USPC .......... 430/108.1, 108.3, 108.6, 108.7, 105
See application file for complete search history.

(56) References Cited

U.S. PATENT DOCUMENTS

| 4,973,540 A | 11/1990 | Machida et al. | |
|---|---|---|---|
| 2004/0067189 A1* | 4/2004 | Sugiura et al. | 423/335 |
| 2010/0009277 A1* | 1/2010 | Ogawa et al. | 430/108.7 |

FOREIGN PATENT DOCUMENTS

| JP | 52-135739 | 11/1977 |
|---|---|---|
| JP | 56-123550 | 9/1981 |
| JP | 58-216252 | 12/1983 |
| JP | 63-73271 A | 4/1988 |
| JP | 63-73272 A | 4/1988 |
| JP | 2-66564 A | 3/1990 |
| JP | 11-143111 A | 5/1999 |
| JP | 11-160907 A | 6/1999 |

* cited by examiner

*Primary Examiner* — Christopher Rodee
*Assistant Examiner* — Omar Kekia

(57) ABSTRACT

In a positively chargeable toner, calcium carbonate fine particles having a certain average primary particle diameter are attached to the surface of toner base particles. The toner base particles contain at least a binder resin and a colorant. The calcium carbonate fine particles are ones which had been subjected to a surface treatment with a positively chargeable surface treating agent and a silicone oil. A mass ratio of the positively chargeable surface treating agent to the silicone oil attached to the surface of the calcium carbonate fine particles is set to be 7:3 to 3:7 in terms of the positively chargeable surface treating agent:the silicone oil.

4 Claims, 1 Drawing Sheet

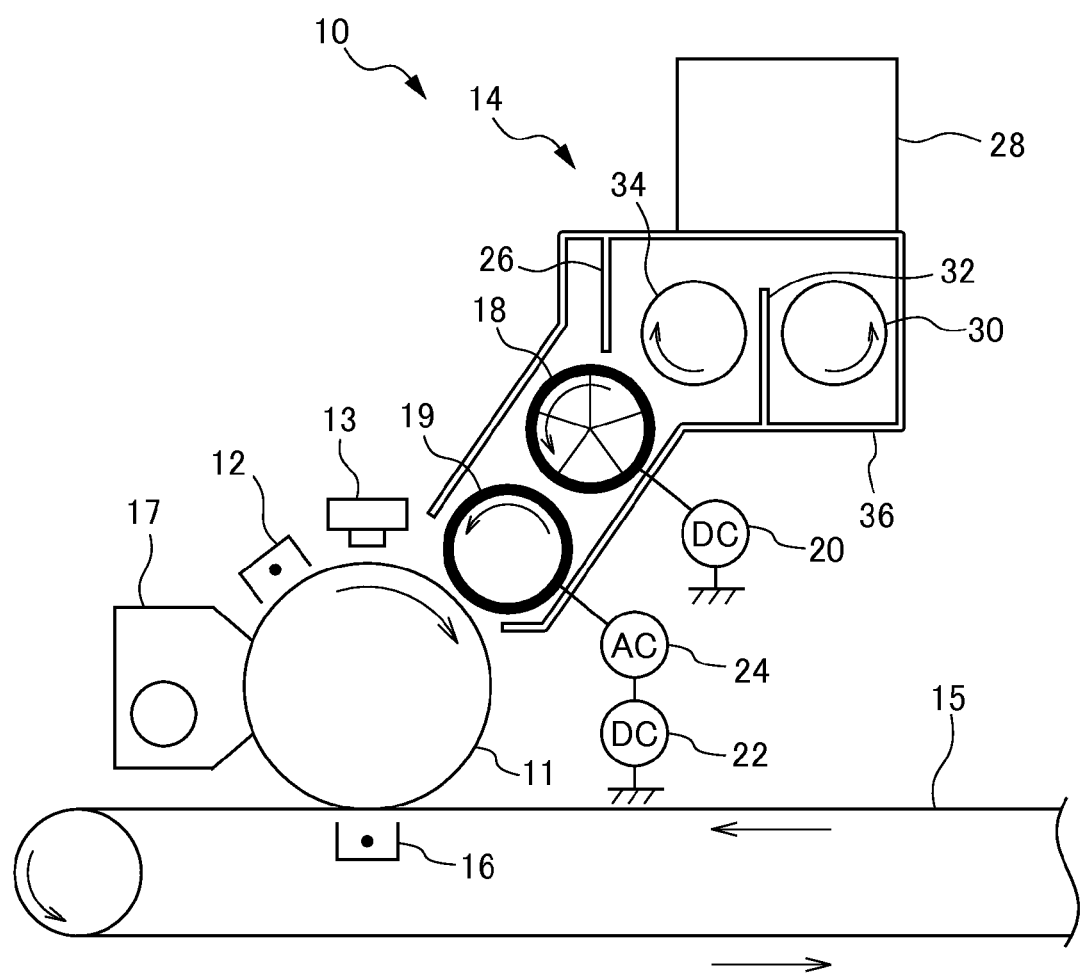

POSITIVELY CHARGEABLE TONER

INCORPORATION BY REFERENCE

This application is based upon and claims the benefit of priority from the corresponding Japanese Patent Application No. 2011-176254, filed in the Japan Patent Office on Aug. 11, 2011, the entire contents of which are incorporated herein by reference.

FIELD

The present disclosure relates to a positively chargeable toner.

BACKGROUND

In electrophotography, after a surface of a photoconductor drum is charged by corona discharge or the like, the charged surface of the photoconductor drum is exposed to a laser or the like to form an electrostatic latent image, which is then developed by a toner to form a toner image, and further the toner image is transferred onto a recording medium to obtain an image with high quality, in general. The toners which may be employed in such a development process are usually provided by: mixing a binder resin such as a thermoplastic resin with a colorant, a charge control agent, a release agent, etc.; kneading the mixture; pulverizing and classifying to give toner particles having an average particle diameter of 5 to 10 μm. Furthermore, for the purpose of imparting flowability to the toner, controlling charge of the toner, and improving easiness of cleaning of the toner from the photoconductor drum, inorganic fine powder such as silica, titanium oxide or alumina is externally added to the toner.

However, these inorganic fine powders tend to be negatively charged in general, and in particular, silica exhibits strong negatively charging property. Thus, in the case in which these inorganic fine powders are used in positively chargeable toners, inorganic fine powders having a positively chargeable polar group introduced on the surface thereof are used.

Specifically, provided are: a toner to which a silica fine powder was externally added which had been subjected to a surface treatment with an aminosilane coupling agent or the like having a positively chargeable polar group; a toner to which a silica fine powder was externally added which had been subjected to a surface treatment with a positively chargeable charge control agent, and a hydrophobilizing agent; and a toner to which a silica fine powder was externally added which had been subjected to a surface treatment with a silane coupling agent having a functional group containing a nitrogen atom, and a silicone oil having a side chain containing a nitrogen atom. These toners exhibit strong positively charging property due to having a positively chargeable polar group such as an amino group on the surface of the toner (i.e., the surface of silica fine powders).

In addition, a toner to which a silica fine powder was externally added was proposed. The silica fine power had been subjected to a surface treatment with a surface treating agent having a negatively chargeable polar group such as a fluorine silane coupling agent, and a surface treating agent having a positively chargeable polar group such as an amine type silane coupling agent. This toner is useful as a toner for nonmagnetic mono-component development due to having a high charge level, and being superior in charge-rising property and flowability.

Furthermore, a toner to which a dry type silica fine powder which has a positively charged polar group introduced therein and which had been subjected to a hydrophobilization treatment using a hydrophobidizing agent, and a wet type silica fine powder which had been subjected to a hydrophobilization treatment with a silicone oil were externally added; and a toner to which a dry type silica fine powder having a positively charged polar group and a hydrophobic group, and a wet type silica fine powder having a positively charged polar group and a fluorine-containing polar group were externally added were proposed. These toners are superior in charge-rising property, durability, and environment stability.

However, since a silica fine powder is used as an inorganic fine powder in the foregoing variety of toners, even if the silica fine powder is subjected to a variety of surface treatment, it has been still difficult to maintain positively charging property of a toner, resulting from the strong negatively charging property exhibited by the silica fine powder. Therefore, according to the aforementioned various toners, in the case in which a toner is subjected to strong stress in a development device, such as a case in which agitation of a toner is continued in a development device by continuing printing at a low coverage for a long time period, and the like, positively charging property of the toner is likely to decrease, and fogging in a formed image and toner scattering from the development device are likely to occur.

SUMMARY

The present disclosure was made in view of the foregoing circumstances, and an object of the present disclosure is to provide a positively chargeable toner that is capable of maintaining favorable positively charging property, and capable of inhibiting occurrence of poor images such as fogging in the formed image and occurrence of toner scattering from the development device, even in a case in which a toner is subjected to strong stress in a development device.

In the positively chargeable toner according to one aspect of the present disclosure, calcium carbonate fine particles are attached to the surface of toner base particles, the toner base particles containing at least a binder resin and a colorant, the calcium carbonate fine particles having an average primary particle diameter of 25 to 80 nm, the calcium carbonate fine particles being ones which had been subjected to a surface treatment with a positively chargeable surface treating agent and a silicone oil, and a mass ratio of the positively chargeable surface treating agent to the silicone oil attached to the surface of the calcium carbonate fine particles being 7:3 to 3:7.

BRIEF DESCRIPTION OF THE DRAWINGS

FIG. 1 shows a configuration diagram illustrating one example of an image forming apparatus.

DETAILED DESCRIPTION OF EMBODIMENTS

The present disclosure is explained in detail by way of embodiments below; however, the present disclosure is not in any way limited to the following embodiments and may be carried out with appropriate modification within the object of the present disclosure. In addition, although explanation may be occasionally omitted with respect to overlapping matters, this does not limit the gist of the present disclosure.

In the positively chargeable toner of the present disclosure (hereinafter, may be also referred to as merely "toner"), calcium carbonate fine particles are attached to the surface of toner base particles, the toner base particles containing at least a binder resin and a colorant, the calcium carbonate fine particles having a certain average primary particle diameter, the calcium carbonate fine particles being ones which had been subjected to a surface treatment with a positively chargeable surface treating agent and a silicone oil, and a mass ratio of the positively chargeable surface treating agent to the silicone oil attached to the surface of the calcium carbonate fine particles being 7:3 to 3:7 in terms of the positively chargeable surface treating agent:the silicone oil. In addition, the positively chargeable toner of the present disclosure may be mixed with a carrier to be used also as a two component developer. Toner base particles and calcium carbonate fine particles that constitute the positively chargeable toner of the present disclosure, a method for producing the positively chargeable toner, a method for producing the two component developer, an image forming method by using the toner of the present disclosure are explained below in this order.

Toner Base Particle

The toner base particles that constitute the positively chargeable toner of the present disclosure include at least a binder resin and a colorant, and if desired, a release agent, a charge control agent and the like may be included. The binder resin and the colorant, which are essential components of the toner base particles used in the present disclosure, the release agent and the charge control agent, which are arbitrary components, and a method for producing toner base particles are explained below in this order.

Binder Resin

The binder resin included in toner base particles is not particularly limited as long as the binder resin is conventionally used as a binder resin of toner particles. Specific examples of the binder resin include thermoplastic resins such as styrene resins, acrylic resins, styrene-acrylic resins, polyethylene resins, polypropylene resins, vinyl chloride resins, polyester resins, polyamide resins, polyurethane resins, polyvinyl alcohol resins, vinyl ether resins, N-vinyl resins, and styrene-butadiene resins. Among these resins, styrene-acrylic resins and polyester resins are preferred in light of dispersibility of the colorant in the toner, charging property of the toner, and fixability of the toner on the paper. The styrene-acrylic resins, and polyester resins are explained in the following.

Styrene-acrylic resins are a copolymer of a styrene monomer and an acrylic monomer. Specific examples of the styrene monomer include styrene, α-methylstyrene, vinyltoluene, α-chlorostyrene, o-chlorostyrene, m-chlorostyrene, p-chlorostyrene, p-ethylstyrene, and the like. Specific examples of the acrylic monomer include (meth)acrylic acid alkyl esters such as methyl acrylate, ethyl acrylate, n-propyl acrylate, iso-propyl acrylate, n-butyl acrylate, iso-butyl acrylate, 2-ethylhexyl acrylate, methyl methacrylate, ethyl methacrylate, n-butyl methacrylate, and iso-butyl methacrylate.

As the polyester resin, those obtained by condensation polymerization or cocondensation polymerization of an alcohol component and a carboxylic acid component may be used. The components which may be used in synthesizing the polyester resin are exemplified by the following alcohol components and carboxylic acid components.

A bivalent, trivalent or higher-valent alcohol may be used as the alcohol component. Specific examples of the bivalent, trivalent or higher-valent alcohols include diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, and polytetramethylene glycol; bisphenols such as bisphenol A, hydrogenated bisphenol A, polyoxyethylenated bisphenol A, and polyoxypropylenated bisphenol A; and trivalent or higher-valent alcohols such as sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Bivalent, trivalent or higher-valent carboxylic acids may be used as the carboxylic acid component. Specific examples of the bivalent, trivalent or higher-valent carboxylic acids include bivalent carboxylic acids such as maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, and malonic acid, or alkyl or alkenyl succinic acids including n-butyl succinic acid, n-butenyl succinic acid, isobutylsuccinic acid, isobutenylsuccinic acid, n-octylsuccinic acid, n-octenylsuccinic acid, n-dodecylsuccinic acid, n-dodecenylsuccinic acid, isododecylsuccinic acid, isododecenylsuccinic acid; and trivalent or higher-valent carboxylic acids such as 1,2,4-benzenetricarboxylic acid (i.e., trimellitic acid), 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and Enpol trimer acid. The bivalent, trivalent or higher-valent carboxylic acids may be used as ester-forming derivatives such as acid halides, acid anhydrides, and lower alkyl esters. The term "lower alkyl" means an alkyl group having 1 to 6 carbon atoms.

When the binder resin is a polyester resin, the softening point of the polyester resin is preferably 80° C. to 150° C., and more preferably 90° C. to 140° C.

As the binder resin, a thermoplastic resin is preferably used since favorable fixability of the toner on the paper is attained, but not only the thermoplastic resin used alone but a crosslinking agent and a thermosetting resin may be added to the thermoplastic resin. By introducing a partially crosslinked structure into the binder resin, storage stability, retention of shape, durability and the like of the toner can be improved without deteriorating the fixability of the toner on the paper.

The thermosetting resin which may be used together with the thermoplastic resin is preferably, for example, an epoxy resin or a cyanate resin. Specific examples of suitable thermosetting resin include bisphenol A type epoxy resins, hydrogenated bisphenol A type epoxy resins, novolak type epoxy resins, polyalkylene ether type epoxy resins, cyclic aliphatic epoxy resins, cyanate resins. These thermosetting resins may be used in a combination of two or more.

The binder resin has a glass transition point (Tg) of preferably 50 to 65° C., and more preferably 50 to 60° C. When the glass transition point of the binder resin is too low, toner particles may fuse with each other inside a development unit of an image forming apparatus, and toner particles may partially fuse with each other during transport of toner vessels and during storage in warehouses and the like, due to deterioration of storage stability. Whereas, when the glass transition point is too low, strength of the binder resin is reduced, and thus the toner is likely to attach to the photoconductor drum and the like. When the glass transition point is too high, fixability at low temperatures of the toner tends to be deteriorated.

It is to be noted that the glass transition point of the binder resin may be determined using a differential scanning calorimeter (DSC) from a point of change in heat capacity. More specifically, a differential scanning calorimeter DSC-6200 manufactured by Seiko Instruments Inc. is used as a measurement apparatus to derive an endothermic curve thereby permitting the determination. A measurement sample in an amount of 10 mg is placed into an aluminum pan, and an endothermic curve is obtained by measuring at a measurement temperature ranging from 25 to 200° C. and at a rate of temperature rise of 10° C./min under normal-temperature and normal-humidity conditions, using an empty aluminum pan as a reference, whereby the glass transition point can be determined from thus obtained endothermic curve.

Colorant

The positively chargeable toner of the present disclosure includes toner base particles containing at least a binder resin and a colorant, and calcium carbonate fine particles are attached to the surface of the toner base particles. Conventional pigments and dyes may be used as the colorant compounded in the toner base particle depending on the color of the toner. Specific examples of appropriate colorants added to the binder resin include black pigments such as carbon black, acetylene black, lamp black, and aniline black; yellow pigments such as chrome yellow, zinc yellow, cadmium yellow, yellow iron oxide, mineral fast yellow, nickel titanium yellow, nables yellow, naphthol yellow S, hanza yellow G, hanza yellow 10G, benzizin yellow G, benzizin yellow GR, quinoline yellow lake, permanent yellow NCG, turtrazin lake, and C.I. pigment yellow 180; orange pigments such as red chrome yellow, molybdenum orange, permanent orange GTR, pyrazolone orange, balcan orange, and indanthrene brilliant orange GK; red pigments such as iron oxide red, cadmium red, minium, cadmium mercury sulfate, permanent red 4R, lisol red, pyrazolone red, watching red calcium salt, lake red D, brilliant carmine 6B, eosine lake, rhodamine lake B, alizarin lake, brilliant carmine 3B, and C.I. pigment red 238; violet pigments such as manganese violet, fast violet B, and methyl violet lake; blue pigments such as Pigment blue 27, cobalt blue, alkali blue, Victoria blue partially chlorinated product, fast sky blue, indanthrene blue BC, and C.I. pigment blue 15:3 (copper phthalocyanine blue pigment); green pigments such as chrome green, chromium oxide, pigment green B, malachite green lake, and final yellow green G; white pigments such as zinc white, titanium dioxide, antimony white, and zinc sulfate; and extender pigments such as baryta powder, barium carbonate, clay, silica, white carbon, talc, and alumina white. These colorants may be used in a combination of two or more for the purpose of tailoring the toner to a desired hue.

Among these colorants, for example, carbon black is preferred as colorant of a black toner, C.I. pigment yellow 180 is preferred as a colorant of a yellow toner, C.I. pigment blue 15:3 (copper phthalocyanine blue pigment) is preferred as a colorant of a cyan toner, and C.I. pigment red 238 is preferred as a colorant of a magenta toner.

The content of the colorant in the toner base particles is not particularly limited providing that it is within a range that does not inhibit the purpose of the present disclosure, and may be appropriately predetermined depending on the type of the colorant. The content of the colorant in the toner base particles is, in light of formability of an image having a desired image density, preferably 1 to 15 parts by mass, and more preferably 2 to 8 parts by mass based on 100 parts by mass of the binder resin, for example.

Release Agent

The positively chargeable toner of the present disclosure may contain a release agent in the binder resin for the purpose of improving fixability of the toner on the paper, and anti-offset property. The type of the release agent that may be compounded to the binder resin is not particularly limited, provided that it falls within a range that does not inhibit the object of the present disclosure. The release agent is preferably a wax; and examples of the wax include polyethylene wax, polypropylene wax, fluorine resin wax, Fischer-Tropsch wax, paraffin wax, ester wax, Montan wax, rice wax, and the like. These waxes may be used in a combination of two or more. Occurrence of offset or image smearing (stain around images occurring upon rubbing the images) may be effectively inhibited by adding the release agent to the toner.

The amount of the release agent used is not particularly limited, provided that it falls within a range that does not inhibit the object of the present disclosure. Specific amount of the release agent used is preferably 0.1 to 20 parts by mass, and more preferably 1 to 8 parts by mass with respect to 100 parts by mass of the binder resin. When the amount of the release agent used is too small, the desired effect may not be achieved for inhibiting the occurrence of offset or image smearing. Whereas, when the amount of the release agent used is excessive, storage stability may be deteriorated due to fusion of the toner itself.

Charge Control Agent

The positively chargeable toner of the present disclosure may include a positively chargeable charge control agent in the binder resin, provided that it falls within a range that does not inhibit the object of the present disclosure. The type of the positively chargeable charge control agent is not particularly limited, provided that it falls within a range that does not inhibit the object of the present disclosure, and may be appropriately selected from among positively chargeable charge control agents conventionally used in toners. Specific examples of the positively chargeable charge control agent include azine compounds such as pyridazine, pyrimidine, pyrazine, ortho-oxazine, meta-oxazine, para-oxazine, ortho-thiazine, meta-thiazine, para-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes constituted with an azine compounds such as azine FastRed FC, azine FastRed 12BK, azine Violet BO, azine Brown 3G, azine Light Brown GR, azine Dark Green BH/C, azine Deep Black EW, and azine Deep Black 3RL; nigrosin compounds such as nigrosin, nigrosin salt, and nigrosin derivatives; acidic dyes that include a nigrosin compound such as nigrosin BK, nigrosin NB, or nigrosin Z; metal salts of naphthenic acid or a higher fatty acid; alkoxylated amine; alkylamide; quaternary ammonium salts such as benzylmethylhexyldecyl ammonium, and decyltrimethylammonium chloride; and the like. Among these positively chargeable charge control agents, nigrosin compounds are particularly preferred since quicker charge-rising property can be attained. These positively chargeable charge control agents may be used in a combination of two or more.

A resin having a quaternary ammonium salt, a carboxylic acid salt, or a carboxyl group as a functional group may be also used as a positively chargeable charge control agent. More specifically, a styrene resin having a quaternary ammonium salt, an acrylic resin having a quaternary ammonium salt, a styrene-acrylic resin having a quaternary ammonium salt, a polyester resin having a quaternary ammonium salt, a styrene resin having a carboxylic acid salt, an acrylic resin having a carboxylic acid salt, a styrene-acrylic resin having a carboxylic acid salt, a polyester resin having a carboxylic acid salt, a styrene resin having a carboxyl group, an acrylic resin having a carboxyl group, a styrene-acrylic resin having a carboxyl group, a polyester resin having a carboxyl group may be exemplified. The molecular weight of these resins is not particularly limited, provided that it falls within a range that does not inhibit the object of the present disclosure; and either an oligomer or a polymer may be included.

Among the resins which may be used as the positively chargeable charge control agent, styrene-acrylic resins having a quaternary ammonium salt as a functional group are more preferred in light of possibility of easy regulation of the charged amount of the toner to fall within a desired range. In a styrene-acrylic resin having a quaternary ammonium salt as a functional group, specific examples of preferable acrylic comonomer to be copolymerized with a styrene unit include (meth)acrylic acid alkyl esters such as methyl acrylate, ethyl acrylate, n-propyl acrylate, iso-propyl acrylate, n-butyl acrylate, iso-butyl acrylate, 2-ethylhexyl acrylate, methyl methacrylate, ethyl methacrylate, n-butyl methacrylate and iso-butyl methacrylate.

In addition, as the quaternary ammonium salt, a unit derived from dialkylaminoalkyl(meth)acrylate, dialkyl(meth)acrylamide, or dialkylaminoalkyl(meth)acrylamide via a step of quaternization. Specific examples of the dialkylaminoalkyl(meth)acrylate include dimethylaminoethyl(meth)acrylate, diethylaminoethyl(meth)acrylate, dipropylaminoethyl(meth)acrylate, dibutylaminoethyl(meth)acrylate; specific examples of the dialkyl(meth)acrylamide include dimethyl methacrylamide; and specific examples of the dialkylaminoalkyl(meth)acrylamide include dimethylaminopropyl methacrylamide. In addition, a hydroxyl group-containing polymerizable monomer such as hydroxyethyl(meth)acrylate, hydroxypropyl(meth)acrylate, 2-hydroxybutyl(meth)acrylate or N-methylol(meth)acrylamide may be used in combination upon polymerization.

The amount of the positively chargeable charge control agent used is not particularly limited, provided that it falls within a range that does not inhibit the object of the present disclosure. Typically, the amount of the positively chargeable charge control agent used is preferably 0.1 to 10 parts by mass, and more preferably 0.5 to 5 parts by mass with respect to 100 parts by mass of the binder resin. When the amount of the charge control agent used is too small, it becomes difficult to stably charge the toner to give a certain polarity, thereby leading to a possibility of making the image density of the formed image less likely to be maintained for a long period of time. Additionally, in such a case, it becomes difficult to allow the charge control agent to be homogenously dispersed, whereby fogging in the formed image and pollution of the photoconductor by the toner are more likely to occur. When the amount of the charge control agent used is excessive, poor images, pollution of the photoconductor by the toner and the like resulting from insufficient charge under high-temperature and high-humidity conditions are likely to be caused due to deterioration of durability against environmental conditions.

Method for Producing Toner Base Particles

The method for producing toner base particles is not particularly limited, and may be appropriately selected from among conventionally known methods for producing toner base particles. A suitable method for producing toner base particles is exemplified by a method explained in the following.

First, the binder resin, and the colorant, and as needed optional components such as the release agent and the charge control agent described in the foregoing are mixed in a mixer or the like. Specific examples of the mixer include Henschel type mixers such as a Henschel mixer, a super mixer and Mechanomill®, Ongumill®, a hybridization system, Cosmosystem®. Of these, a Henschel mixer is preferred.

Subsequently, the obtained mixture is melted and kneaded by a kneading machine. Specific examples of the kneading machine include extruders such as a twin-screw extruder, triple roll mills, laboblast mills, and an extruder is suitably used. In addition, a temperature during the melting and kneading is not particularly limited, provided that it falls within a range that does not inhibit the object of the present disclosure, and is preferably a temperature no lower than the softening point of the binder resin, and lower than the thermal decomposition temperature of the binder resin.

After the melted and kneaded matter thus obtained is cooled to give a solid matter, the solid matter is pulverized by a pulverizer or the like. Specific examples of the pulverizer include air flow pulverizers such as a jet pulverizer (jet mill) for pulverizing using an ultrasonic jet air stream, mechanical pulverizers such as a turbo mill as well as impact pulverizers and the like, and air flow pulverizers are more preferred.

Excessively pulverized particles and roughly pulverized particles are removed from the obtained pulverized matter using a classifier or the like to give toner base particles having a desired particle diameter. Specific examples of the classifier include wind power classifiers (rotary wind power classifiers) such as an elbow-jet air classifier, centrifugal classifiers and the like, and wind power classifiers are more preferred. The particle diameter of the toner base particles is preferably 4.5 to 9.0 μm in terms of a volume average particle diameter.

To the toner base particles obtained using the materials described above are externally added calcium carbonate fine particles described later to produce the positively chargeable toner of the present disclosure.

Calcium Carbonate Fine Particle

According to the positively chargeable toner of the present disclosure, calcium carbonate fine particles are subjected to a surface treatment such that a positively chargeable surface treating agent and a silicone oil are attached to give a mass ratio of these being 7:3 to 3:7 and more preferably 6:4 to 4:6 in terms of the positively chargeable surface treating agent to the silicone oil, and the calcium carbonate fine particles are attached to the surface of toner base particles.

The calcium carbonate fine particles may be appropriately selected for use from among calcium carbonate fine particles having a variety of particle diameters, provided that calcium carbonate fine particles fall within a range that does not inhibit the object of the present disclosure. The primary particle diameter of the calcium carbonate fine particles in the toner is 25 to 80 nm, and preferably 30 to 55 nm since a toner having a superior balance of flowability and developability is likely to be obtained.

The primary particle diameter of the calcium carbonate fine particles in the toner may be determined by measuring an average Feret's diameter by an SEM inspection. The average Feret's diameter is defined as an average value of 100 calcium carbonate fine particles which were arbitrarily selected.

Also, the calcium carbonate fine particles which may be used include those which had been allowing for conducting using an electrically conductive surface treating agent to adjust the volume resistivity.

Hereinafter, the positively chargeable surface treating agent, the silicone oil, and the electrically conductive surface treating agent used for the surface treatment of the calcium carbonate fine particles are explained in this order.

[Positively Chargeable Surface Treating Agent]

The type of the positively chargeable surface treating agent is not particularly limited as long as it is a substance having a positively charged polar group, and can be attached to the surface of the calcium carbonate fine particles. Suitable examples of the positively chargeable surface treating agent include resinous materials used as a positively chargeable charge control agent, coupling agents having a positively charged polar group such as an amino group.

Among these positively chargeable surface treating agents, a coupling agent is preferred in light of resistance to detachment due to chemical binding to the surface of calcium carbonate fine particles. Specific examples of the coupling agent which may be used as a positively chargeable surface treating agent include silane coupling agents, titanate coupling agents, and aluminate coupling agent. Of these coupling agents, silane coupling agents are particularly preferred. Examples of the silane coupling agent having a positively charged polar group include aminosilane coupling agents represented by the following formula and any mixture of the same.

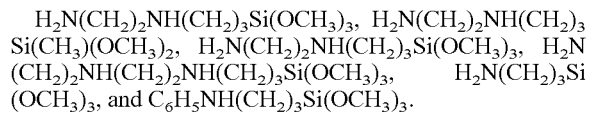

The amount of the positively chargeable surface treating agent used in treating the surface of the calcium carbonate fine particles is preferably 10 to 30% by mass, and more preferably 15 to 25% by mass with respect to the mass of untreated calcium carbonate fine particles. In other words, in the case of a toner, the positively chargeable surface treating agent is preferably contained in such a proportion with respect to the mass of calcium carbonate included in the toner. When the amount of the positively chargeable surface treating agent used is too small, a desired positively charging property of a toner may not be attained. When the amount of the positively chargeable surface treating agent used is excessive, poor images may be formed in the case in which the toner is agitated for a long period of time in the development device, and the like, thereby the positively chargeable surface treating agent is detached from the surface of the calcium carbonate fine particles, and the detached positively chargeable surface treating agent is attached to, for example, a developing roller inside the developing device.

In a specific example of the surface treatment method with the positively chargeable surface treating agent, untreated calcium carbonate fine particles and the positively chargeable surface treating agent are mixed by a wet process, or a dry process, and thereafter aggregated calcium carbonate fine particles are pulverized. The positively chargeable surface treating agent may be used either directly, or after diluting in an organic solvent.

The amount of the positively chargeable surface treating agent attached to the surface of the calcium carbonate fine particles may be measured by, for example, the following method. First, the structure of the positively chargeable surface treating agent used in the treatment of calcium carbonate fine particles is specified, and the element composition of the positively chargeable surface treating agent is determined. Subsequently, if the subject to be analyzed is a two component developer, the two component developer is screened with a sieve capable of separating into the carrier and the toner (for example, a sieve having a mesh opening size of 23 μm) to isolate the toner from the two component developer. Thus obtained toner in an amount of 0.5 g is filled into a forming machine, and compressed to 10 MPa to produce a pellet having a diameter of 20 mm. Using the obtained pellet as a sample, an analysis is carried out with an X-ray fluorescence spectrometer (ZSX (manufactured by Rigaku Corporation)) to measure from the intensity of the X-ray (kcps) the amount of elements derived from the positively chargeable surface treating agent (for example, N, Si, Al and Ti), the amount of Si derived from the silicone oil, and the content of Ca derived from calcium carbonate in the sample. Next, the mass of the positively chargeable surface treating agent with respect to the mass of calcium carbonate fine particles is calculated based on the obtained measurement of the content of the elements derived from the positively chargeable surface treating agent and the measurement of the content of Ca, and the element composition of the positively chargeable surface treating agent.

Silicone Oil

The type of the silicone oil is not particularly limited, provided that it falls within a range that does not inhibit the object of the present disclosure, and a variety of silicone oils may be used which have been conventionally used as treating agents of external additives for toners. The silicone oil preferably has a linear siloxane structure, and any of a nonreactive silicone oil and a reactive silicone oil may be used. Specific examples of the silicone oil include dimethyl silicone oil, phenylmethyl silicone oil, chlorophenyl silicone oil, alkyl silicone oil, chlorosilicone oil, polyoxyalkylene modified silicone oil, fatty acid ester modified silicone oil, methyl hydrogen silicone oil, silanol group-containing silicone oil, an alkoxy group-containing silicone oil, acetoxy group-containing silicone oil, amino modified silicone oil, carboxylic acid modified silicone oil, alcohol modified silicone oil. Of these, dimethyl silicone oil is more preferred owing to a superior hydrophobilization effect, and favorable availability of silicone oils having a variety of viscosity.

The amount of the silicone oil used in treating the surface of calcium carbonate fine particles is preferably 10 to 30% by mass, and more preferably 15 to 25% by mass with respect to the mass of the untreated calcium carbonate fine particles. In other words, when included in a toner, the silicone oil is preferably contained in such a proportion with respect to the mass of calcium carbonate included in the toner. When the amount of the silicone oil used is too small, a decrease in the amount of charge of the toner under high-temperature and high-humidity conditions is less likely to be inhibited, or the flowability of the toner may be insufficient. When the amount of the silicone oil used is excessive, the amount of positively charged polar groups exposed to the surface of the calcium carbonate fine particles decreases, whereby a desired positively charging property may be less likely to be attained.

In a specific example of the surface treatment method of the calcium carbonate fine particles with a silicone oil, the silicone oil is added dropwise to or sprayed on the calcium carbonate fine particles which had been subjected to a surface treatment with the aforementioned positively chargeable surface treating agent while agitating at a high speed. When the silicone oil is added dropwise or sprayed, the silicone oil may be used either directly, or after diluting with an organic solvent or the like. Although the surface treatment with the silicone oil may be carried out concomitantly with the treatment with the positively chargeable surface treating agent, it is preferably carried out after the treatment with the positively chargeable surface treating agent. The effect achieved by treating the calcium carbonate fine particles with a silicone oil is an effect resulting from hydrophobilization of calcium carbonate fine particles, and thus it is necessary to attach the silicone oil to the outermost surface of the calcium carbonate fine particles.

The amount of the silicone oil attached to the surface of the calcium carbonate fine particles may be measured by, for example, the following method. First, if the subject to be analyzed is a two component developer, the two component developer is screened with a sieve capable of separating into the carrier and the toner (for example, a sieve having a mesh opening size of 23 μm) to isolate the toner from the two component developer. Thus obtained toner in an amount of 0.5 g is filled into a forming machine, and compressed to 10 MPa to produce a pellet having a diameter of 20 mm. Using the obtained pellet as a sample, an analysis is carried out with an X-ray fluorescence spectrometer (ZSX (manufactured by Rigaku Corporation)) to measure from the intensity of the X-ray (kcps) the amount of elements derived from the positively chargeable surface treating agent (for example, N, Si, Al and Ti), the amount of Si derived from the silicone oil, and the content of Ca derived from calcium carbonate in the sample. Next, the mass of the silicone oil with respect to the mass of calcium carbonate fine particles is calculated based on the obtained content of Si derived from the silicone oil and the content of Ca, and the element composition of the silicone oil.

Electrically Conductive Surface Treating Agent

The electrically conductive surface treating agent used for adjusting the volume resistivity of the calcium carbonate fine particles is not particularly limited, provided that it falls within a range that does not inhibit the object of the present disclosures. Examples of suitable electrically conductive surface treating agent include treating agents containing an aqueous solution of stannic chloride and an aqueous solution of antimony trichloride. An electrically conductive coating layer containing a hydrate of tin oxide and a hydrate of antimony oxide can be formed on the surface of the calcium carbonate fine particles by adding an aqueous solution of stannic chloride and an aqueous solution of antimony trichloride to the calcium carbonate fine particles dispersed in water to permit the reaction under acidic conditions. It is to be noted that the treatment with the electrically conductive surface treating agent is preferably carried out before the surface treatment with the positively chargeable surface treating agent and the silicone oil since the electrically conductive surface treating agent used in the form of an aqueous solution is less likely to be favorably attached to the surface of the calcium carbonate fine particles in the state in which the silicone oil is attached to the calcium carbonate fine particles.

The value of the volume resistivity of the calcium carbonate fine particles is not particularly limited, provided that it falls within a range that does not inhibit the object of the present disclosure, and is preferably $1.0 \times 10^6$ to $1.0 \times 10^{10}$ Ωcm. When the value of the volume resistivity of the calcium carbonate fine particles falls within such a range, even if stress is continued to be applied to the toner for a long period of time in the development device, particularly, the toner is likely to maintain favorable positively charging property, and occurrence of poor images such as fogging in the formed image and toner scattering from the development device are more likely to be inhibited.

Method for Producing a Positively Chargeable Toner

The positively chargeable toner of the present disclosure is produced by attaching the calcium carbonate fine particles to the surface of the toner base particles mentioned above. The method for attaching the calcium carbonate fine particles to the surface of the toner base particle surfaces is not particularly limited, and for example, the method preferably includes adjusting treatment conditions such that the calcium carbonate fine particles are not embedded into the toner base particles, and mixing the toner base particles with the calcium carbonate fine particles by a variety of mixer. Specific examples of the mixer include a turbine type agitator, a Henschel mixer, a super mixer and the like, and a Henschel mixer is more preferred.

In the positively chargeable toner of the present disclosure, for the purpose of improving flowability, storage stability, easiness of cleaning, etc., of the toner, inorganic fine particles other than the calcium carbonate fine particles may be attached as the external additive to the surface of the toner base particles together with the calcium carbonate fine particles, provided that they fall within a range that does not inhibit the object of the present disclosure.

The type of the inorganic fine particles other than the calcium carbonate fine particles used as an external additive is not particularly limited, provided that it falls within a range that does not inhibit the object of the present disclosure, and may be appropriately selected from those conventionally used for toners. Specific examples of suitable external additive include silica and metal oxides such as alumina, titanium oxide, magnesium oxide, zinc oxide, strontium titanate, and barium titanate. These external additives may be used in a combination of two or more.

The amount of the calcium carbonate fine particles used with respect to the toner base particles is preferably 0.5 to 8.0 parts by mass, and more preferably 1.5 to 6.0 parts by mass with respect to 100 parts by mass of the toner base particles. When the amount of the calcium carbonate fine particles used is too small, the toner is less likely to attain a desired positively charging property, and as a result, effects of inhibiting occurrence of poor images such as fogging in the formed image, and occurrence of toner scattering from the development device may be less likely to be achieved. When the amount of the calcium carbonate fine particles used is excessive, poor images may be formed in the formed image since the calcium carbonate fine particles detached from the surface of the positively chargeable toner attach to, for example, a developing roller inside the developing device. Additionally, in the case in which an external additive other than the calcium carbonate fine particles is used together with the calcium carbonate fine particles as the external additive, the total amount of these used is preferably no greater than 4.0 parts by mass with respect to 100 parts by mass of the toner base particles.

The average primary particle diameter of the inorganic fine particles other than the calcium carbonate fine particles is not particularly limited, provided that it falls within a range that does not inhibit the object of the present disclosure, and typically, the average primary particle diameter is preferably 0.01 to 1.0 μm.

The volume-specific resistance value of the inorganic fine particles other than the calcium carbonate fine particles can be also adjusted similarly to the calcium carbonate fine particles by forming a coating layer consisting of tin oxide and antimony oxide on a surface thereof and changing a thickness of the coating layer or a ratio of tin oxide to antimony oxide.

Method for Producing a Two Component Developer

The positively chargeable toner of the present disclosure may be mixed with a desired carrier and used as a two component developer. In a case of preparing the two component developer, a magnetic carrier is preferably used.

A carrier, of which carrier core material is coated with a resin, is exemplified as the carrier which is preferable in the case of using the positively chargeable toner of the present disclosure as the two component developer. Specific examples of the material of carrier core are particles of iron, oxidized iron, reduced iron, magnetite, copper, silicon steel, ferrite, nickel, and cobalt; alloy particles of these materials and manganese, zinc, aluminum, etc.; particles of iron-nickel alloy, iron-cobalt alloy, etc.; ceramic particles of titanium oxide, aluminum oxide, copper oxide, magnesium oxide, lead oxide, zirconium oxide, silicon carbide, magnesium titanate, barium titanate, lithium titanate, lead titanate, lead zirconate, lithium niobate, etc.; particles of higher permittivity materials such as ammonium dihydrogen phosphate, potassium dihydrogen phosphate, and Rochelle salts; resin carriers in which these magnetic particles are dispersed in resins; and the like.

Specific examples of the resin, coating the core material of carrier, include (meth)acrylic polymer, styrene polymer, styrene-(meth)acrylic polymer, olefin polymer (polyethylene, chlorinated polyethylene, polypropylene, etc.), polyvinyl chloride, polyvinyl acetate, polycarbonate, cellulose resin, polyester resin, unsaturated polyester resin, polyamide resin, polyurethane resin, epoxy resin, silicone resin, fluorocarbon resin (tetrafluoroethylene-hexafluoropropylene copolymer resin, tetrafluoroethylene-perfluoroalkylvinyl ether copolymer resin, polytetrafluoroethylene, polychlorotrifluoroethylene, polyvinylidene fluoride, etc.), phenol resin, xylene resin, diallyl phthalate resin, polyacetal resin, amino resin (polyamide resin, polyimide resin, polyamideimide resin, etc.), and the like. These resins may be used in a combination of two or more.

The particle diameter of the carrier, which is not particularly limited providing that it is within a range that does not inhibit the purpose of the present disclosure, is preferably 20 to 200 μm and more preferably 25 to 100 μm as a particle diameter measured by an electron microscope.

The apparent density of the carrier is not particularly limited providing that it is within a range that does not inhibit the purpose of the present disclosure. Typically, the apparent density of the carrier, which depends on a carrier composition and surface structure thereof, is preferably $2.4 \times 10^3$ to $3.0 \times 10^3$ kg/m³.

When the positively chargeable toner of the present disclosure is used as the two component developer, the content of the toner is preferably 3% to 15% by mass based on the mass of the two component developer. By adjusting the content of the toner in the two component developer into the range, an appropriate image density is maintained in formed images, and pollution inside image forming apparatuses, and adhesion of the toner to transfer paper etc. may be inhibited because of inhibiting toner scattering.

Image Forming Method

The positively chargeable toner of the present disclosure can be used in a variety of image forming apparatuses in which images are formed by a mono-component development system, or a two component development system. Herein, among the two component development systems, a touchdown development system that is suitable in terms of image quality, and lifespan is explained with reference to FIG. 1. According to the touchdown development system, fogging, and scattering of the toner are likely to occur due to insufficient charge of the toner; therefore, effects achieved by using the two component developer containing the toner of the present disclosure can be markedly achieved.

In the touchdown development system, a magnetic brush is formed which is composed of the two component developer on the surface of the magnetic roller. Then, only the toner is carried from the magnetic brush to the surface of a developing roller disposed opposite to a photoconductor, thereby forming a toner layer. Subsequently, the toner is flown from the toner layer, and the electrostatic latent image on the surface of the photoconductor is developed as a toner image.

The image forming apparatus 10 of the touchdown development system shown in FIG. 1 is provided with a drum-shaped photoconductor 11, a charging unit 12 for charging the surface of the photoconductor 11, an exposure unit 13 for exposing the surface of the photoconductor 11 to form an electrostatic latent image, a development unit 14 for developing the electrostatic latent image by a toner to form a toner image, a transfer unit 16 that transfers the toner image from the photoconductor 11 to a recording medium that moves on an endless belt 15, and a cleaning unit 17 that cleans the surface of the photoconductor.

The photoconductor 11 is exemplified by an inorganic photoconductor produced by forming a photosensitive layer of selenium, amorphous silicon or the like on an electrically conductive substrate; an organic photoconductor produced by forming a monolayer or a laminate of a photosensitive layer containing a charge generator, a charge transport agent, a binder resin, etc., on an electrically conductive substrate. The charging unit 12 is exemplified by a charging apparatus of a scorotron system, a charging roller, a charging brush. As the exposure unit 13, the transfer unit 16 and the cleaning unit 17, those which are well-known may be used.

The development unit 14 is provided with a magnetic roller (developer bearing member) which is to have a magnetic brush of a two component developer formed on its surface, a developing roller 19 (toner bearing member) which is to have a toner layer (not shown in the FIGURE) formed on its surface by a toner carried from the magnetic brush (not shown in the FIGURE) formed on the magnetic roller 18, an electric power supply 20 that applies a direct current (DC) bias to the magnetic roller 18, an electric power supply 22 that applies a direct current (DC) bias to the developing roller 19, a electric power supply 24 that applies an alternating current (AC) bias to the developing roller 19, a regulation blade 26 for maintaining a height of the magnetic brush formed on the magnetic roller 18 constant, a container 28 for housing the toner, an agitation mixer 30 for charging the toner in the two component developer, a paddle mixer 34 for supplying the two component developer supplied from the agitation mixer 30 to the magnetic roller 18 while agitating, a partition plate 32 for dividing the agitation mixer 30 from the paddle mixer 34 (the developer is supplied from the agitation mixer 30 to the paddle mixer 34 via a flow path not shown in the FIGURE but present between the partition plate 32 and a frame body 36 described below), and a frame body 36 for housing the magnetic roller 18, the developing roller 19, the agitation mixer 30 and the paddle mixer 34. A plurality of stationary magnets (not shown in the FIGURE) is provided inside the magnetic roller 18, and a sleeve type magnetic roller 18 is rotatable around the stationary magnets. Further, the developing roller 19 is disposed opposite to the photoconductor 11.

In the image forming apparatus of the touchdown development system shown in FIG. 1, an image is formed with a method which includes, for example: a charge step for charging the surface of the photoconductor 11 by the charging unit 12; an exposure step for exposing the surface of the photoconductor 11 by the exposure unit 13 to form an electrostatic latent image; and a development step for forming a magnetic brush with the two component developer constituted with the toner and a carrier, isolating only the toner from the magnetic brush to form a toner layer, and attaching the toner in the toner layer to an exposed portion of the electrostatic latent image on the surface of the photoconductor 11 to transform the electrostatic latent image to a toner image.

A specific image forming method is as in the following. First, the surface of the photoconductor 11 is charged by the charging unit 12. Next, the surface of the photoconductor 11 is exposed by the exposure unit 13 to form an electrostatic latent image. On the other hand, in the development unit 14, the toner in the two component developer is charged by the agitation mixer 30, and the two component developer is supplied to the magnetic roller 18 by the paddle mixer 34 to allow for support the two component developer on the surface thereof, thereby forming the magnetic brush. Subsequently, only the toner is carried from the magnetic brush to the surface of the developing roller 19 to form a toner layer on the surface of the developing roller 19.

Then, the toner is flown from the toner layer on the developing roller 19, and the toner is attached to an exposed portion of the electrostatic latent image on the photoconductor 11, thereby developing the electrostatic latent image as a toner image. Thereafter, the toner image is transferred by the transfer unit 16 from the photoconductor 11 to the recording medium that moves on the endless belt 15, whereby an image is formed. Also, separately, the surface of the photoconductor 11 after the transfer step is cleaned by using the cleaning unit 17. The foregoing steps are repeatedly carried out.

The toner supplied from the container 28 is mixed with a carrier by the agitation mixer 30 to produce the two component developer.

When the positively chargeable toner of the present disclosure explained above is used, a favorable positively charging property is maintained, whereby occurrence of poor images such as fogging in the formed image, and occurrence of toner scattering from the development device can be inhibited. Particularly in the case in which an image is formed with a high coverage rate, a feed amount of the toner per unit of time increases, and thus a more superior positively charging property is demanded for the toner; however, according to the positively chargeable toner of the present disclosure, occurrence of poor images such as fogging in the formed image can be inhibited even when an image is formed with a high coverage rate. In addition, according to the two component developer in which the positively chargeable toner of the present disclosure is used, occurrence of fogging in the formed image, and occurrence of scattering of the toner from a development device can be favorably inhibited also in a touchdown development system.

EXAMPLES

The present disclosure is explained more specifically with reference to Examples below. It is to be noted that the present disclosure is not in any way limited to the Examples.

Example 1

External Additive CC-A (Preparation of Calcium Carbonate Fine Particle A)

Calcium carbonate fine particles (average primary particle diameter: 45 nm) in an amount of 100 parts by mass were charged into an encapsulated type Henschel mixer, and agitated. Subsequently, 20 parts by mass of a positively chargeable surface treating agent (KBM-603, aminosilane coupling agent, N-2-(aminoethyl)-3-aminopropyltrimethoxysilane (manufactured by Shin-Etsu Chemical Co., Ltd.)), and 20 parts by mass of a silicone oil (KF-96, dimethyl silicone oil (manufactured by Shin-Etsu Chemical Co., Ltd.)) were uniformly sprayed with a spray onto the calcium carbonate fine particles being agitated. Thereafter, calcium carbonate fine particles were maintained at 110° C. for 2 hrs while being agitated to carry out a surface treatment of the calcium carbonate fine particles with the positively chargeable surface treating agent and silicone oil. After eliminating byproducts produced by the surface treatment through reducing pressure inside the Henschel mixer, heating at 200° C. for 1 hour gave calcium carbonate fine particles A (CC-A). The average primary particle diameter of the calcium carbonate fine particles A was determined by measuring an average Feret's diameter with SEM inspection. The average primary particle diameter of the calcium carbonate fine particles A was 49 nm. It is to be noted that the average Feret's diameter was determined as an average value of diameters of arbitrarily selected 100 calcium carbonate fine particles. The volume resistivity value of the external additive CC-A (calcium carbonate fine particle A) is shown in Table 1. It is to be noted that measurement of the volume resistivity value of the calcium carbonate fine particles was carried out using R8340A HIGH RESISTANSE METER (manufactured by Advantest Corporation) while applying a load of 1 kg to the sample, and a DC voltage of 10 V.

(Preparation of Toner Base Particles)

After 100 parts by mass of a polyester resin (binder resin; acid value: 5.6 mg KOH/g, melting point: 120° C.), 4 parts by mass of a copper phthalocyanine blue pigment (colorant, C.I. Pigment Blue 15:3), 5 parts by mass of a wax (release agent, Carnauba WAX (manufactured by Nippon Seiro Co., Ltd.)), and 1 part by mass of a charge control agent (P51 (manufactured by Clariant (Japan) K.K.)) were mixed in a Henschel mixer, the mixture was melted and kneaded with an extruder to obtain a melt kneaded matter. After the resulting melted and kneaded matter was cooled, it was coarsely pulverized with a hammer mill to give a coarsely pulverized matter. Next, the coarsely pulverized matter was finely pulverized with a turbo mill, followed by classification with an elbow-jet classifier to obtain toner base particles having an average particle diameter of 6.8 μm.

(Preparation of Positively Chargeable Toner)

To 100 parts by mass of the obtained toner base particles were added 3.0 parts by mass calcium carbonate fine particles A, followed by mixing in a Henschel mixer (10B (manufactured by Nippon Coke & Engineering Company, Limited)) under a condition of 3,300 rpm for 5 min to obtain a positively chargeable toner.

(Preparation of Two Component Developer)

A two component developer was obtained by mixing the positively chargeable toner and a carrier which has been used as a magnetic carrier for printer FS-05300DN (manufactured by KYOCERA MITA Corporation), average particle diameter: 35 μm) in a rocking mixer (RM-10 (manufactured by AICHI ELECTRIC Co., Ltd.)) under a condition including 78 rpm, a temperature of 20° C. and a humidity of 60% for 30 min such that the proportion of the positively chargeable toner in the two component developer became 11.0% by mass.

The following evaluations were made on the obtained two component developer and positively chargeable toner by forming an image using a printer (FS-5300DN) manufactured by KYOCERA MITA Corporation as an evaluation machine, under a condition including a temperature of 20° C. and a relative humidity of 65%, i.e., in a normal-temperature and normal-humidity environment. The results of the evaluation of the image density are shown in Table 2; the results of the evaluation of fogging are shown in Table 3; the results of the evaluation of the toner scattering are shown in Table 4; and the results of the evaluation of the charged amount of the toner are shown in Table 5.

(Evaluation of Image Density)

The two component developer was set in the printer, and then the power of the printer was turned on, followed by stabilization of the printer. Thereafter, output of a sample image was carried out. The image thus obtained was defined as an initial image (first piece). Subsequently, while a replenishment toner was supplied, an image with a coverage rate of 1% was printed on 5,000 pieces. On the 5,000th piece, output of a sample image for evaluation was conducted, and this image was defined as a low-density print image 1. Thereafter, while the replenishment toner was supplied, an image with a coverage rate of 30% was printed on 1,000 pieces. It is to be noted that on the 1,000th piece (i.e., the 6,000th piece from the initial image), output of a sample image for evaluation was conducted, and this image was defined as a high-density print image 1. Subsequently, the image with a coverage rate of 1% was printed on 5,000 pieces, and thereafter, an image with a coverage rate of 80% was printed on 1,000 pieces. On the 1,000th piece (i.e., the 12,000th piece from the initial image), output of a sample image for evaluation was conducted, and this image was defined as a high-density print image 2. Furthermore, for an image with a coverage rate of 0.2% was printed on 5,000 pieces for evaluation on acceleration. On the 5,000th piece (i.e., 17,000th piece from the initial image), output of a sample image for evaluation was conducted, and this image was defined as a low-density print image 2.

In each of the initial image, the low-density print image 1, the high-density print image 1, the high-density print image 2, and the low-density print image 2, solid images of 2 cm×2 cm are formed at three positions, i.e. a position near the left end, a central position and a position near the right end, with respect to a transport direction of the sheet.

The reflection density of the solid images at three positions of each image for evaluation thus formed was measured using a reflection densitometer (RD-19A: SpectroEye LT (manufactured by Gretag Macbeth GmbH)). Then, an average value of the reflection densities (average value of 9 positions) was defined as an image density of the obtained image.

With regard to the determined image density value, evaluation was made as: "A" for being no less than 1.4, "B" for being no less than 1.3 and less than 1.4; "C" for being no less than 1.2 and less than 1.3; and "D" for being less than 1.2.

(Evaluation of Fogging)

The fogging density of the initial image used in Evaluation of Image Density was measured. With respect to the image printed on 5,000 pieces with a coverage rate of 1% when the low-density print image 1 was evaluated in Evaluation of Image Density, the fogging density was measured every 100 pieces, from the 100th piece to the 5,000th piece. A maximum value of the fogging densities measured on every 100 pieces was defined as the fogging density of the low-density print image 1. With respect to the image printed on 1,000 pieces with a coverage rate of 30% when the high-density print image 1 was evaluated in Evaluation of Image Density, the fogging density was measured every 100 pieces, from the 100th piece to the 1,000th piece. A maximum value of the fogging densities measured on every 100 pieces was defined as the fogging density of the high-density print image 1. With respect to the image printed on 1,000 pieces with a coverage rate of 80% when the high-density print image 2 was evaluated in Evaluation of Image Density, the fogging density was measured every 100 pieces, from the 100th piece to the 1,000th piece. A maximum value of the fogging densities measured on every 100 pieces was defined as the fogging density of the high-density print image 2. With respect to the image printed on 5,000 pieces with a coverage rate of 0.2% when the low-density print image 2 was evaluated in Evaluation of Image Density, the fogging density was measured every 100 pieces, from the 100th piece to the 5,000th piece. A maximum value of the fogging densities measured on every 100 pieces was defined as the fogging density of the low-density print image 2. It is to be noted that as the fogging density, a value obtained by subtracting the value of the image density of a base paper (i.e. blank before the image output) from the value of the image density of a blank equivalent portion as measured by the reflection densitometer was employed.

With regard to the maximum value of the fogging densities, evaluation was made as: "A" for being no greater than 0.003; "B" for being greater than 0.003 and no greater than 0.007; and "C" for being greater than 0.007.

(Toner Scattering)

The two component developer was set in a printer, and after the development device was subjected to no-load running for 2 hrs, 3.5 g of the toner was forcedly supplied to the development device. Thereafter, no-load running of the development device was carried out for 5 min, and the toner accumulated during this running in the tray provided under the development device (scattered toner) was recovered and the amount thereof (amount of scattering) was measured. With regard to the amount of scattering, evaluation was made as "A" for being no greater than 50 mg; "B" for being greater than 50 mg and no greater than 200 mg; and "C" for being greater than 200 mg. This evaluation demonstrates simulative measurement of the amount of a toner scattered outside from a development device.

(Evaluation of Charged Amount)

The developer immediately after printing the initial image, the low-density print image 1, the high-density print image 1, the high-density print image 2 and the low-density print image 2 was removed, and the charged amount of each developer thus obtained was measured using a suction type charge amount measuring apparatus (MODEL 210HS (manufactured by TREK Inc.)).

Examples 2 and 3, and Comparative Examples 1 to 5

Preparation of External Additives CC-B to CC-H
(Calcium Carbonate Fine Particles B to H)

In a similar manner to the external additive CC-A (calcium carbonate fine particle A) except that the amount of the positively chargeable surface treating agent used, and the amount of the silicone oil used were changed as shown in Table 1, external additives CC-B to CC-H (calcium carbonate fine particles B to H) were prepared. It is to be noted that the amount of the positively chargeable surface treating agent used, and the amount of the silicone oil used shown in Table 1 are based on % by mass with respect to the mass of the untreated calcium carbonate fine particles. The average primary particle diameters and the volume resistivity value of the external additives CC-B to CC-H were determined by a similar method to the external additive CC-A. The average primary particle diameters and the volume resistivity value of the external additives CC-B to CC-H (calcium carbonate fine particles B to H) are shown in Table 1.

(Preparation of Positively Chargeable Toner)

Positively chargeable toners were obtained in a similar manner to Example 1 except that in place of the external additive CC-A (calcium carbonate fine particle A), the external additives (CC-B to CC-H) shown in Table 1 were used as the external additive.

(Preparation of Two Component Developer)

Using the positively chargeable toners thus obtained, two component developers were obtained similarly to Example 1.

Using the two component developers thus obtained, evaluations of the image density, fogging, toner scattering, and charged amount were made similarly to Example 1. The results of these evaluations are shown in Table 2 to Table 5.

Example 4, Example 5, Comparative Example 6, and Comparative Example 7

Preparation of External Additive (CC-I to CC-L)

External additives CC-I to CC-L were prepared in a similar manner to CC-A, except that the average primary particle diameter of the untreated calcium carbonate fine particles was changed. The average primary particle diameters and the volume resistivity value of the external additives CC-I to CC-L were determined by a similar method to the external additive CC-A. The average primary particle diameters and the volume resistivity value of the external additives CC-I to CC-L are shown in Table 1.

(Preparation of Positively Chargeable Toner)

Positively chargeable toners were obtained in a similar manner to Example 1 except that in place of CC-A, the external additives (CC-I to CC-L) shown in Table 1 were used.

(Preparation of Two Component Developer)

Using the positively chargeable toners thus obtained, two component developers were obtained similarly to Example 1.

Using the two component developers thus obtained, evaluations of the image density, fogging, toner scattering, and charged amount were made similarly to Example 1. The results of these evaluations are shown in Table 2 to Table 5.

Examples 6 to 8

Preparation of External Additives CC-M to CC-O (Calcium Carbonate Fine Particles M to O)

The calcium carbonate fine particles having an average primary particle diameter of 45 nm used in Example 1 were added to ion exchanged water such that the concentration of the calcium carbonate fine particles was 100 g/L to obtain a suspension of the calcium carbonate fine particles. After the obtained suspension was heated to 70° C., a solution prepared by dissolving 2 g of tin chloride ($SnCl_4.5H_2O$), and 0.1 g of antimony chloride ($SbCl_3$) in 50 ml of a 2 N aqueous hydrochloric acid solution was added dropwise to the suspension at the same temperature over 1 hour. During the dropwise addition of the solution containing tin chloride and antimony chloride, the pH of the suspension was adjusted to fall within the range of 2 to 3 with an aqueous sodium hydroxide solution having a concentration of 10% by mass. After the suspension was filtered to recover the calcium carbonate fine particles covered with hydrates of tin oxide and antimony oxide, the recovered calcium carbonate fine particles were washed with ion exchanged water. Subsequently, the washed calcium carbonate fine particles were baked at 600° C. An aggregate of the calcium carbonate fine particles obtained after baking was pulverized by a jet mill to give calcium carbonate fine particles subjected to a conducting treatment having an average primary particle diameter of 49 nm. Thus resulting calcium carbonate fine particles subjected to a conducting treatment were treated with the positively chargeable surface treating agent and the silicone oil similarly to the external additive CC-A (calcium carbonate fine particle A) to obtain an external additive CC-M (calcium carbonate fine particle M). The volume resistivity value of the external additive CC-M (calcium carbonate fine particle M) is shown in Table 1. It is to be noted that measurement of the volume resistivity value of the calcium carbonate fine particles was carried out using R8340A HIGH RESISTANSE METER (manufactured by Advantest Corporation) while applying a load of 1 kg to the sample, and a DC voltage of 10 V.

The volume resistivity value of the calcium carbonate fine particles can be adjusted by changing the amount of tin chloride and antimony chloride used. Thus, in a similar manner to Preparation of External Additive CC-M (calcium carbonate fine particle M) except that the amounts of tin chloride and antimony chloride used were changed to adjust the volume resistivity value of the calcium carbonate fine particles, an external additive CC-N (calcium carbonate fine particle N), and an external additive CC-O (calcium carbonate fine particle O) were obtained. The volume resistivity values of the external additive CC-N (calcium carbonate fine particle N), and the external additive CC-O (calcium carbonate fine particle O) are shown in Table 1. In addition, the average primary particle diameters and the volume resistivity value of the external additives CC-M to CC-O (calcium carbonate fine particles M to O) were determined by a similar method to the external additive CC-A. The average primary particle diameters and the volume resistivity value of the external additives CC-M to CC-O (calcium carbonate fine particles M to O) are shown in Table 1.

(Preparation of Positively Chargeable Toner)

Positively chargeable toners were obtained in a similar manner to Example 1 except that in place of the external additive CC-A (calcium carbonate fine particle A), the external additives (CC-M to CC-O) shown in Table 1 were used.

(Preparation of Two Component Developer)

Using the positively chargeable toners thus obtained, two component developers were obtained similarly to Example 1.

Using the two component developers thus obtained, evaluations of the image density, fogging, toner scattering, and charged amount were made similarly to Example 1. The results of these evaluations are shown in Table 2 to Table 5.

Comparative Example 9

Preparation of External Additive SI-A (Silica Fine Particle)

An external additive SI-A (silica fine particle) was prepared in a similar manner to the external additive CC-A (calcium carbonate fine particle A), except that silica fine particles having an average primary particle diameter of 20 nm were used in place of the calcium carbonate fine particles having an average primary particle diameter of 45 nm. The average primary particle diameter of the external additive SI-A (silica fine particle) was determined by a similar method to the external additive CC-A. The average primary particle diameter of the external additive SI-A (silica fine particle) is shown in Table 1.

(Preparation of Positively Chargeable Toner)

Positively chargeable toners were obtained in a similar manner to Example 1 except that in place of the external additive CC-A (calcium carbonate fine particle A), the external additive (SI-A) shown in Table 1 was used.

(Preparation of Two Component Developer)

Using the positively chargeable toner thus obtained, a two component developer was obtained similarly to Example 1.

Using the two component developer thus obtained, evaluations of the image density, fogging, toner scattering, and charged amount were made similarly to Example 1. The results of these evaluations are shown in Table 2 to Table 5.

TABLE 1

| External additive | Amount of positively chargeable surface treating agent used (% by mass) | Amount of silicone oil used (% by mass) | Ratio of amount used (positively chargeable surface treating agent:silicone oil) | Average primary particle diameter (nm) | Volume resistivity ($\Omega$cm) |
|---|---|---|---|---|---|
| CC-A | 20 | 20 | 5:5 | 49 | $3.7 \times 10^{12}$ |
| CC-B | 28 | 12 | 7:3 | 49 | $3.0 \times 10^{12}$ |
| CC-C | 12 | 28 | 3:7 | 49 | $3.9 \times 10^{12}$ |
| CC-D | 32 | 8 | 8:2 | 49 | $2.8 \times 10^{12}$ |
| CC-E | 8 | 32 | 2:8 | 49 | $4.5 \times 10^{12}$ |
| CC-F | 30 | 0 | — | 48 | $2.0 \times 10^{12}$ |
| CC-G | 0 | 30 | — | 48 | $5.0 \times 10^{12}$ |
| CC-H | 0 | 0 | — | 45 | $8.0 \times 10^{11}$ |
| CC-I | 20 | 20 | 5:5 | 20 | $4.5 \times 10^{12}$ |
| CC-J | 20 | 20 | 5:5 | 25 | $4.2 \times 10^{12}$ |
| CC-K | 20 | 20 | 5:5 | 80 | $2.0 \times 10^{12}$ |
| CC-L | 20 | 20 | 5:5 | 150 | $8.9 \times 10^{11}$ |
| CC-M | 20 | 20 | 5:5 | 49 | $9.5 \times 10^{5}$ |
| CC-N | 20 | 20 | 5:5 | 49 | $1.2 \times 10^{9}$ |
| CC-O | 20 | 20 | 5:5 | 49 | $3.2 \times 10^{6}$ |
| SI-A | 20 | 20 | 5:5 | 22 | — |

TABLE 2

| | | Image density (density/evaluation) | | | | |
|---|---|---|---|---|---|---|
| | External additive | Coverage rate 0.1% Initial image (1 piece) | Coverage rate 1% Low-density print image 1 (5,000 pieces) | Coverage rate 30% High-density print image 1 (1,000 pieces) | Coverage rate 80% High-density print image 2 (1,000 pieces) | Coverage rate 0.2% Low-density print image 2 (5,000 pieces) |
| Example 1 | CC-A | 1.44/A | 1.38/B | 1.45/A | 1.46/A | 1.27/C |
| Example 2 | CC-B | 1.39/B | 1.35/B | 1.44/A | 1.45/A | 1.24/C |
| Example 3 | CC-C | 1.46/A | 1.39/B | 1.46/A | 1.47/A | 1.29/C |
| Example 4 | CC-J | 1.45/A | 1.28/C | 1.46/A | 1.47/A | 1.22/C |
| Example 5 | CC-K | 1.39/B | 1.37/B | 1.39/B | 1.39/B | 1.29/C |
| Example 6 | CC-M | 1.47/A | 1.45/A | 1.48/A | 1.50/A | 1.35/B |
| Example 7 | CC-N | 1.45/A | 1.43/A | 1.46/A | 1.46/A | 1.35/B |
| Example 8 | CC-O | 1.47/A | 1.45/A | 1.48/A | 1.48/A | 1.41/A |
| Comparative Example 1 | CC-D | 1.37/B | 1.15/D | 1.38/B | 1.38/B | 1.02/D |
| Comparative Example 2 | CC-E | 1.50/A | 1.48/A | 1.52/A | 1.55/A | 1.39/B |
| Comparative Example 3 | CC-F | 1.25/C | 1.12/D | 1.27/C | 1.29/C | 0.95/x |
| Comparative Example 4 | CC-G | 1.50/A | 1.49/A | 1.55/A | 1.56/A | 1.39/B |
| Comparative Example 5 | CC-H | 1.15/D | 1.01/D | 1.18/D | 1.18/D | 0.88/D |
| Comparative Example 6 | CC-I | 1.44/A | 1.19/D | 1.46/A | 1.48/A | 1.08/D |
| Comparative Example 7 | CC-L | 1.25/C | 1.18/D | 1.28/C | 1.29/C | 1.15/D |
| Comparative Example 8 | SI-A | 1.44/A | 1.43/A | 1.47/A | 1.50A | 1.28/C |

TABLE 3

| | | Fogging (density/evaluation) | | | | |
|---|---|---|---|---|---|---|
| | External additive | Coverage rate 0.1% Initial image (1 piece) | Coverage rate 1% Low-density print image 1 (5,000 pieces) | Coverage rate 30% High-density print image 1 (1,000 pieces) | Coverage rate 80% High-density print image 2 (1,000 pieces) | Coverage rate 0.2% Low-density print image 2 (5,000 pieces) |
| Example 1 | CC-A | 0.002/A | 0.001/A | 0.002/A | 0.003/A | 0.001/A |
| Example 2 | CC-B | 0.001/A | 0.001/A | 0.002/A | 0.005/B | 0.002/A |
| Example 3 | CC-C | 0.001/A | 0.001/A | 0.002/A | 0.002/A | 0.001/A |
| Example 4 | CC-J | 0.001/A | 0.001/A | 0.002/A | 0.003/A | 0.001/A |
| Example 5 | CC-K | 0.001/A | 0.001/A | 0.002/A | 0.002/A | 0.001/A |
| Example 6 | CC-M | 0.002/A | 0.002/A | 0.004/B | 0.006/B | 0.002/A |
| Example 7 | CC-N | 0.002/A | 0.001/A | 0.002/A | 0.003/A | 0.001/A |
| Example 8 | CC-O | 0.002/A | 0.002/A | 0.002/A | 0.003/A | 0.002/A |
| Comparative Example 1 | CC-D | 0.003/A | 0.002/A | 0.004/B | 0.007/B | 0.002/A |
| Comparative Example 2 | CC-E | 0.002/A | 0.003/A | 0.005/B | 0.007/B | 0.003/A |
| Comparative Example 3 | CC-F | 0.001/A | 0.001/A | 0.003/A | 0.006/B | 0.001/A |
| Comparative Example 4 | CC-G | 0.003/A | 0.002/A | 0.005/B | 0.010/C | 0.002/A |
| Comparative Example 5 | CC-H | 0.001/A | 0.001/A | 0.003/A | 0.008/C | 0.001/A |
| Comparative Example 6 | CC-I | 0.001/A | 0.001/A | 0.002/A | 0.002/A | 0.001/A |
| Comparative Example 7 | CC-L | 0.001/A | 0.001/A | 0.002/A | 0.002/A | 0.001/A |
| Comparative Example 8 | SI-A | 0.001/A | 0.001/A | 0.009/C | 0.015/C | 0.004/B |

TABLE 4

| | | Toner scattering | |
|---|---|---|---|
| | External additive | Amount of scattering (mg) | Evaluation |
| Example1 | CC-A | 34 | A |
| Example2 | CC-B | 40 | A |
| Example3 | CC-C | 38 | A |
| Example4 | CC-J | 32 | A |
| Example5 | CC-K | 39 | A |
| Example6 | CC-M | 70 | B |
| Example7 | CC-N | 37 | A |
| Example8 | CC-O | 45 | A |
| Comparative Example 1 | CC-D | 95 | B |
| Comparative Example2 | CC-E | 230 | C |
| Comparative Example3 | CC-F | 135 | B |
| Comparative Example4 | CC-G | 300 | C |
| Comparative Example5 | CC-H | 100 | B |
| Comparative Example6 | CC-I | 42 | A |
| Comparative Example7 | CC-L | 39 | A |
| Comparative Example8 | SI-A | 340 | C |

TABLE 5

| | | Charged amount($\mu$C/g) | | | | |
|---|---|---|---|---|---|---|
| | External additive | Coverage rate 0.1% Initial image (1 piece) | Coverage rate 1% Low-density print image 1 (5,000 pieces) | Coverage rate 30% High-density print image 1 (1,000 pieces) | Coverage rate 80% High-density print image 2 (1,000 pieces) | Coverage rate 0.2% Low-density print image 2 (5,000 pieces) |
| Example 1 | CC-A | 24.0 | 26.0 | 23.5 | 22.0 | 30.0 |
| Example 2 | CC-B | 28.0 | 30.0 | 25.0 | 21.5 | 34.0 |
| Example 3 | CC-C | 21.0 | 22.0 | 21.5 | 20.7 | 29.7 |
| Example 4 | CC-J | 25.0 | 26.3 | 24.5 | 23.5 | 29.3 |

TABLE 5-continued

| | | Charged amount(μC/g) | | | | |
|---|---|---|---|---|---|---|
| | External additive | Coverage rate 0.1% Initial image (1 piece) | Coverage rate 1% Low-density print image 1 (5,000 pieces) | Coverage rate 30% High-density print image 1 (1,000 pieces) | Coverage rate 80% High-density print image 2 (1,000 pieces) | Coverage rate 0.2% Low-density print image 2 (5,000 pieces) |
| Example 5 | CC-K | 22.3 | 23.2 | 20.9 | 20.3 | 31.2 |
| Example 6 | CC-M | 20.2 | 20.5 | 18.0 | 16.8 | 24.3 |
| Example 7 | CC-N | 23.5 | 23.2 | 22.1 | 21.8 | 28.4 |
| Example 8 | CC-O | 22.5 | 22.0 | 21.2 | 20.1 | 22.9 |
| Comparative Example 1 | CC-D | 30.0 | 34.0 | 26.0 | 23.2 | 38.0 |
| Comparative Example 2 | CC-E | 19.0 | 19.5 | 18.0 | 16.0 | 22.0 |
| Comparative Example 3 | CC-F | 35.0 | 40.0 | 30.0 | 24.0 | 43.0 |
| Comparative Example 4 | CC-G | 16.0 | 17.0 | 15.5 | 13.8 | 20.0 |
| Comparative Example 5 | CC-H | 19.0 | 21.1 | 18.2 | 16.0 | 27.0 |
| Comparative Example 6 | CC-I | 25.5 | 27.0 | 24.0 | 23.5 | 30.0 |
| Comparative Example 7 | CC-L | 22.0 | 23.2 | 21.5 | 20.8 | 26.0 |
| Comparative Example 8 | SI-A | 35.0 | 30.0 | 25.0 | 17.0 | 15.0 |

According to Examples 1 to 8, it is proven that when calcium carbonate fine particles having an average primary particle diameter of 25 to 80 nm which had been subjected to a surface treatment such that the mass ratio of the positively chargeable surface treating agent to the silicone oil attached to the surface of the calcium carbonate fine particles became 7:3 to 3:7 were used in a toner, formation of an image having a desired density was enabled while preventing fogging in the formed image, and toner scattering from the development device, as shown in Table 2 to Table 4.

In addition, according to Examples 6 to 8, it is revealed that when the volume resistivity of the calcium carbonate was $1.0 \times 10^6$ to $1.0 \times 10^{10}$ Ωcm, an image having a desired density in particular, was likely to be formed as shown in Table 2.

According to Table 5, it is revealed that the toners of Comparative Examples 1 and 3 were likely to be positively charged in excess since the amount of the positively chargeable surface treating agent used is too great relative to that of the silicone oil, or since calcium carbonate fine particles treated with a positively chargeable surface treating agent alone were used as an external additive. Therefore, as shown in Table 2, it is proven that the toners of Comparative Examples 1 and 3 were less likely to form an image having a desired image density after a continuous printing with a low coverage rate.

As is seen from the charged amount upon formation of the initial image shown in Table 5, toners of Comparative Examples 2 and 4 were less likely to be positively charged since the amount of the silicone oil used was too great relative to the positively chargeable surface treating agent, or since calcium carbonate fine particles treated with a silicone oil alone were used. In addition, as is seen from Table 5, the toners of Comparative Examples 2 and 4 were likely to have a charged amount decreased when formation of images having high image density was carried out. Therefore, as shown in Tables 3 and 4, the toner of Comparative Example 4 was likely to cause fogging on the image formed when printed with a coverage rate as high as 80%, and the toners of Comparative Examples 2 and 4 were likely be accompanied by toner scattering from the development device.

According to Comparative Example 5, it is revealed that when the calcium carbonate fine particles which had not been subjected to a surface treatment were used as an external additive, fogging and toner scattering from the development device were likely to occur when printed with a coverage rate as high as 80%, and an image having a desired density was less likely to be formed irrespective of the coverage rate.

Since calcium carbonate fine particles having a too great or too small average primary particle diameter were used in the toners of Comparative Example 6 and 7, flowability of the toner was likely to be deteriorated. Thus, the toners of Comparative Examples 6 and 7 were less likely to form an image having a desired density when printed with a low coverage rate although the calcium carbonate fine particles had been subjected to a surface treatment similarly to CC-A used in the toner of Example 1.

In the toner of Comparative Example 8, silica fine particles were used as an external additive. Since silica fine particles are likely to be negatively charged, the toner of Comparative Example 8 had a charged amount that is highly likely to decrease as shown in Table 5, even though the silica fine particles had been subjected to a surface treatment in a similar manner to the external additive CC-A (calcium carbonate fine particle A) used in the toner of Example 1. Accordingly, as shown in Table 3 and Table 4, the toner of Comparative Example 8 was likely to cause fogging on the image formed after formation of images with a coverage rate as high as 80% continued, and was likely to be accompanied by toner scattering from the development device.

What is claimed is:

1. A positively chargeable toner, wherein calcium carbonate fine particles are attached to the surface of toner base particles, the toner base particles containing at least a binder resin and a colorant, the calcium carbonate fine particle having an average primary particle diameter of 25 to 80 nm, the calcium carbonate fine particles being ones which had been subjected to a surface treatment with a positively chargeable surface treating agent and a silicone oil after a conducting treatment, a mass ratio of the positively chargeable surface treating agent to the silicone oil attached to the surface of the calcium carbonate fine particles being 7:3 to 3:7, and the calcium carbonate fine particles have a volume resistivity of $1.0\times10^6$ to $1.0\times10^{10}$ $\Omega$cm.

2. The positively chargeable toner according to claim 1, wherein the amount of the positively chargeable surface treating agent in the toner is 10 to 30% by mass with respect to the mass of calcium carbonate in the toner.

3. The positively chargeable toner according to claim 1, wherein the amount of the silicone oil in the toner is 10 to 30% by mass with respect to the mass of calcium carbonate in the toner.

4. The positively chargeable toner according to claim 1, wherein the positively chargeable surface treating agent is a coupling agent.

* * * * *